(12) United States Patent
McGoldrick et al.

(10) Patent No.: US 8,461,267 B2
(45) Date of Patent: *Jun. 11, 2013

(54) PROPYLENE POLYMERS WITH IMPROVED PROPERTIES

(76) Inventors: James McGoldrick, Marchtrenk (AT); Franz Ruemer, St. Georgen/Gusen (AT); Stefan Schiesser, Leonding (AT); Siegfried Liedauer, Wilhering (AT)

( * ) Notice: Subject to any disclaimer, the term of this patent is extended or adjusted under 35 U.S.C. 154(b) by 0 days.

This patent is subject to a terminal disclaimer.

(21) Appl. No.: 13/477,682

(22) Filed: May 22, 2012

(65) Prior Publication Data

US 2012/0302680 A1 Nov. 29, 2012

Related U.S. Application Data

(63) Continuation of application No. 12/857,341, filed on Aug. 16, 2010, now abandoned, which is a continuation of application No. 10/478,549, filed as application No. PCT/EP02/05548 on May 21, 2002, now abandoned.

(30) Foreign Application Priority Data

May 21, 2001 (EP) .................................. 01112367

(51) Int. Cl.
    *C08F 8/00* (2006.01)
    *C08F 110/06* (2006.01)
(52) U.S. Cl.
    USPC ............ 525/192; 525/194; 525/195; 526/351
(58) Field of Classification Search
    USPC ........................ 525/192, 194, 195; 526/351
    See application file for complete search history.

(56) References Cited

U.S. PATENT DOCUMENTS

| | | | |
|---|---|---|---|
| 4,606,953 A | 8/1986 | Suzuki et al. | |
| 5,310,584 A | 5/1994 | Jacoby et al. | |
| 5,362,808 A | 11/1994 | Brosius et al. | |
| 5,824,714 A | 10/1998 | Broennum et al. | |
| 6,051,638 A | 4/2000 | Auger et al. | |
| 6,169,144 B1 | 1/2001 | Higashi et al. | |
| 6,187,402 B1 | 2/2001 | Ek et al. | |
| 6,235,823 B1 | 5/2001 | Ikeda et al. | |
| 6,251,995 B1 | 6/2001 | Hesse et al. | |
| 6,279,614 B1 | 8/2001 | Riesselmann et al. | |
| 6,433,087 B1 | 8/2002 | Ebner et al. | |
| 6,503,993 B1 | 1/2003 | Huovinen et al. | |
| 6,632,850 B2 | 10/2003 | Hughes et al. | |
| 6,747,103 B1 | 6/2004 | Vestberg et al. | |
| 7,235,203 B2 | 6/2007 | Sadamitsu et al. | |
| 8,304,049 B2 * | 11/2012 | Machl et al. | 428/36.9 |
| 2003/0008091 A1 | 1/2003 | Konrad et al. | |
| 2003/0157286 A1 | 8/2003 | Hesse et al. | |
| 2004/0157969 A1 | 8/2004 | McGoldrick et al. | |
| 2004/0165156 A1 | 8/2004 | Akiyama | |
| 2005/0025922 A1 * | 2/2005 | Rydin et al. | 428/36.91 |

FOREIGN PATENT DOCUMENTS

| | | |
|---|---|---|
| DE | 33 19 515 | 11/1984 |
| DE | 199 27 477 | 12/1999 |
| EP | 0 142 724 | 5/1985 |
| EP | 0 190 889 | 8/1986 |
| EP | 0 384 431 | 8/1990 |
| EP | 0 450 342 | 10/1991 |
| EP | 0 574 801 | 12/1993 |
| EP | 0 574 804 | 12/1993 |
| EP | 0 634 454 | 1/1995 |
| EP | 0 678 527 | 10/1995 |
| EP | 0 688 817 | 12/1995 |
| EP | 0 972 801 | 1/2000 |
| EP | 1 174 261 | 1/2002 |
| JP | 60-110717 | 6/1985 |
| JP | 4-135844 | 5/1992 |
| JP | 8-300561 | 11/1996 |
| JP | 8-300562 | 11/1996 |
| JP | 9-227707 | 9/1997 |
| JP | 10-076601 | 3/1998 |
| JP | 2000-044909 | 2/2000 |
| WO | WO-96/23239 | 8/1996 |
| WO | WO-97/33117 | 9/1997 |
| WO | WO-98/43806 | 10/1998 |
| WO | WO-99/35430 | 7/1999 |
| WO | WO-01/40327 | 7/2001 |
| WO | WO-02/38670 | 5/2002 |

* cited by examiner

*Primary Examiner* — Nathan M Nutter
(74) *Attorney, Agent, or Firm* — Jordan and Hamburg LLP

(57) ABSTRACT

The invention relates to novel propylene polymers with improved properties especially with improved stiffness and impact strength comprising propylene homopolymers or propylene block copolymers with 90.0 to 99.9 wt % propylene and 0.1 to 10 wt % α-olefins with 2 or 4 to 18 carbon atoms, or mixtures thereof, wherein the propylene homopolymers or propylene block copolymers are β-nucleated propylene polymers, whereby the β-nucleated propylene homopolymers have an IRτ≧0.98 and the values for tensile modulus and Charpy impact strength as specified herein. The β-nucleated propylene block copolymers are polymers having an IRτ of the propylene homopolymer block of ≧0.98 and the values for tensile modulus and Charpy impact strength as also specified herein. The propylene polymers with an improved property spectrum are suitable for producing molded parts in a pipe system, such as pipes and fittings, inspection chambers, pipe ducting systems, extrusion or compression molded sheets and the like.

16 Claims, No Drawings

PROPYLENE POLYMERS WITH IMPROVED PROPERTIES

REFERENCE TO RELATED APPLICATIONS

The present application is a continuation application of copending U.S. application Ser. No. 12/857,341 filed Aug. 16, 2010, which is a continuation application of U.S. application Ser. No. 10/478,549 filed Feb. 25, 2004, now abandoned, which is the entry into the U.S. National Stage of International Application No. PCT/EP02/05548 filed May 21, 2002. The subject matter of the aforementioned applications are hereby incorporated herein by reference.

FIELD OF THE INVENTION

The invention relates to propylene polymers with improved properties as well as to a process for producing them.

BACKGROUND OF THE INVENTION

Propylene polymer compositions from common propylene polymers and β-nucleating agents are known. β-Nucleating agents are useful in compositions for forming unstretched films which can be made porous by extraction of β-spherulites and stretching the films (disclosed for example in U.S. Pat. No. 4,386,129; U.S. Pat. No. 4,975,469).

Another effect of β-nucleating agents in propylene compositions is the improved thermoformability. As the melting point of the β-form of the spherulites of polypropylene based resins is generally about 144 to 148° C., contrasted with the typical melting point range of α-form spherulites of about 159 to 163° C., melt forming from these compositions is possible at lower temperatures and higher production rates (WO 93/12 262).

The disadvantage of these compositions having good impact properties is that they show unsatisfactory strength.

Conventional polypropylene homopolymers usually show high stiffness, but poor impact strength. Conventional β-nucleated polypropylenes usually have improved impact strength but also exhibit reduced stiffness.

OBJECT OF THE INVENTION

Therefore it is the object of the present invention to provide propylene polymers with improved properties characterized in having high stiffness and good impact properties simultaneously.

BRIEF DESCRIPTION OF THE INVENTION

According to the present invention, this object is achieved by propylene polymers with improved properties comprising propylene homopolymers with melt indices of 0.05 to 15 g/10 min at 230° C./2.16 kg or propylene block copolymers with 90.0 to 99.9 wt % propylene and 0.1 to 10 wt % α-olefins with 2 or 4 to 18 carbon atoms with melt indices of 0.05 to 20 g/10 min at 230° C./2.16 kg, or mixtures thereof, wherein the propylene homopolymers or propylene block copolymers are β-nucleated propylene polymers, whereby the β-nucleated propylene homopolymers have an IRτ≧0.98, a tensile modulus of ≧1500 MPa at +23° C. and a Charpy impact strength of ≧3 kJ/m² at −20° C. using notched test specimens, and the β-nucleated propylene block copolymers are polymers having an IRτ of the propylene homopolymer block of ≧0.98, a tensile modulus of 1100 MPa at +23° C. and a Charpy impact strength, of 6 kJ/m² at −20° C., using notched test specimens.

DETAILED DESCRIPTION OF THE INVENTION

β-nucleated propylene polymers are isotactic propylene polymers composed of chains in a 3₁ helical conformation having an internal microstructure of β-form spherulites being composed of radial arrays of parallel stacked lamellae. This microstructure can be realized by the addition of β-nucleating agents to the melt and subsequent crystallization. The presence of the β-form can be detected through the use of wide angle X-ray diffraction (Moore, J., Polypropylene Handbook, p. 134-135, Hanser Publishers Munich 1996).

The IRτ of the propylene polymers is measured and calculated as described in EP 0 277 514 A2 on page 5 (column 7, line 53 to column 8, line 11).

According to a preferred embodiment the β-nucleated propylene homopolymers or the propylene homopolymer block of the β-nucleated propylene block copolymers have an IRτ of ≧20.985. The difference of 0.005 in IRτ, IRτ being a measure for isotacticity, encompasses a significant increase in mechanical polymer properties, especially in stiffness.

The propylene homopolymers according to the present invention have melt indices of 0.05 to 15 g/10 min at 230° C./2.16 kg, preferably 0.1 to 8 g/10 min at 230° C./2.16 kg, most preferably 0.2 to 5 g/10 min at 230° C./2.16 kg.

The propylene copolymers according to the present invention have melt indices of 0.05 to 20 g/10 min at 230° C./2.16 kg, preferably 0.1 to 8 g/10 min at 230° C./2.16 kg, most preferably 0.2 to 5 g/10 min at 230° C./2.16 kg.

According to the present invention the propylene homopolymers show a tensile modulus ≧1500 MPa, preferably ≧1600 MPa and the propylene copolymers show a tensile modulus ≧1100 MPa, preferably ≧21300 MPa and most preferably ≧1500 MPa.

The propylene homopolymers according to the present invention have a Charpy impact strength of ≧3 kJ/m² at −20° C., preferably 4 to 10 kJ/m² at −20° C., most preferably 5 to 10 kJ/m² at −20° C.

The propylene copolymers according to the present invention have a Charpy impact strength of ≧6 kJ/m² at −20° C., preferably ≧29 kJ/m² at −20° C., most preferably ≧10 kJ/m² at −20° C. Charpy impact strength of up to at least 60 kJ/m² is possible for copolymers according to the invention.

According to an advantageous feature of the present invention the β-nucleated propylene polymers with an IRτ≧0.98 being propylene polymers obtained by polymerization with a Ziegler-Natta catalyst system comprising titanium-containing solid components, an organoalumina, magnesium or titanium compound as cocatalyst and an external donor according to the formula

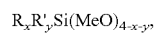

$R_xR'_ySi(MeO)_{4-x-y}$, wherein R and R' are identical or different and are branched or cyclic aliphatic or aromatic hydrocarbon residues, and y and x independently from each other are 0 or 1, provided that x+y are 1 or 2.

Examples of propylene polymers with high IRE obtained by polymerization with a Ziegler-Natta catalyst system, for example by slurry, bulk or gas phase polymerization, are propylene polymers as described in EP-A-0,790,262, WO 99/24,478 and WO 99/16,797.

A preferred external donor of the Ziegler-Natta catalyst system is dicyclopentyldimethoxysilane.

According to a preferred embodiment the β-nucleated propylene polymer contains 0.01 to 2.0 wt %, in each case based on the propylene polymers used, of
dicarboxylic acid derivative type diamide compounds from $C_5$-$C_8$-cycloalkyl monoamines or $C_6$-$C_{12}$-aromatic monoamines and $C_5$-$C_8$-aliphatic, $C_5$-$C_8$-cycloaliphatic or $C_6$-$C_{12}$-aromatic dicarboxylic acids, preferably N,N'-di-$C_5$-$C_8$-cycloalkyl-2,6-naphthalene dicarboxamide compounds, N,N'-di-$C_5$-$C_8$-cycloalkyl-4,4-biphenyldicarboxamide compounds, N,N'-di-$C_5$-$C_8$-cycloalkyl-terephthalamide compounds, N.N'-di-$C_5$-$C_8$-cycloalkyl-1,4-cyclohexanedicarbox-amide compounds and/or N,N'-di-$C_6$-$C_{12}$-aryl-$C_5$-$C_8$-diamide compounds; and/or diamine derivative type diamide compounds from $C_5$-$C_8$-cycloalkyl monocarboxylic acids or $C_6$-$C_{12}$-aromatic monocarboxylic acids and $C_5$-$C_8$-cycloaliphatic or $C_6$-$C_{12}$-aromatic diamines, preferably N,N'—$C_6$-$C_{12}$-arylene-bis-benzamide compounds, N,N'—$C_5$-$C_8$-cycloalkyl-bis-benzamide compounds, N,N'-p-$C_6$-$C_{12}$-arylene-bis-$C_5$-$C_8$-cycloalkylcarboxamide compounds and/or N,N'—$C_5$-$C_8$-cycloalkyl-bis-cyclohexanecarboxamide compounds; and/or
amino acid derivative type diamide compounds from amidation reaction of $C_5$-$C_8$-alkyl-, $C_5$-$C_8$-cycloalkyl- or $C_6$-$C_{12}$-arylamino acids, $C_5$-$C_8$-alkyl-, $C_5$-$C_8$-cycloalkyl- or $C_6$-$C_{12}$-aromatic monocarboxylic acid chlorides and $C_5$-$C_8$-alkyl-, $C_5$-$C_8$-cycloalkyl- or $C_6$-$C_{12}$-aromatic mono-amines, preferably N-phenyl-5-(N-benzoylamino)pentaneamide and/or N-cyclohexyl-4-N-cyclohexylcarbonylamino)benzamide, as p-nucleating agent.

Examples of N,N'-di-$C_5$-$C_8$-cycloalkyl-2,6-naphthalene dicarboxamide compounds are N,N'-dicyclohexyl-2,6-naphthalene dicarboxamide and N,N'-dicyclooctyl-2,6-naphthalene dicarboxamide.

Examples of N,N'-di-$C_5$-$C_8$-cycloalkyl4,4-biphenyldicarboxamide compounds are N,N'-dicyclohexyl-4,4-biphenyldicarboxamide and N.N'-dicyclopentyl-4,4-biphenyldicarboxamide.

Examples of N,N'-di-$C_5$-$C_8$-cycloalkylterephthalamide compounds are N,N'-dicyclohexylterephthalamide and N,N'-dicyclopentylterephthalamide.

Examples of N,N'-di-$C_5$-$C_8$-cycloalkyl-1,4-cyclohexanedicarboxamide compounds are N,N'-dicyclohexyl-1,4-cyclohexanedicarboxamide and N,N'-dicyclohexyl-1,4-cyclopentanedicarboxamide.

Examples of N,N'-di-$C_6$-$C_{12}$-aryl-Cs-C-diamide compounds are N,N'-bis(p-methylphenyl)-hexanediamide, N,N'-bis(4-cyclohexylphenyl)hexanediamide, N,N'-diphenylhexanediamide, N,N'-diphenyloctanediamide and N,N'-bis(p-ethylphenyl)hexanediamide.

Examples of N,N'—$C_6$-$C_{12}$-arylene-bis-benzamide compounds are N,N'-p-phenylene-bis-benzamide and N,N'-1,5-naphthalene-bis-benzamide.

Examples of N,N'—$C_5$-$C_8$-cycloalkyl-bis-benzamide compounds are N,N'-1,4-cyclopentane-bis-benzamide and N,N'-1,4-cyclohexane-bis-benzamide.

Examples of N,N'-p-$C_6$-$C_{12}$-arylene-bis-$C_5$-$C_8$-cycloalkylcarboxamide compounds are N,N'-1,5-naphthalene-bis-cyclohexanecarboxamide and N,N'-1,4-phenylene-bis-cyclohexanecarboxamide.

Examples of N,N'—$C_5$-$C_8$-cycloalkyl-bis-cyclohexanecarboxamide compounds are N,N'-1,4-cyclopentane-bis-cyclohexanecarboxamide and N,N'-1,4-cyclohexane-bis-cyclohexanecarboxamide.

According to a further preferred embodiment the β-nucleated propylene polymer contains 0.0001 to 2.0 wt % of quinacridone type compounds, especially quinacridone, dimethylquinacridone and/or dimethoxyquinacridone; quinacridonequinone type compounds, especially quinacridonequinone, a mixed crystal of 5,12-dihydro(2,3b)acridine-7,14-dione with quino(2,3b)acridine-6,7,13,14-(5H, 12H)-tetrone as disclosed in EP-B 0 177 961 and/or dimethoxyquinacridonequinone; and/or dihydroquinacridone type compounds, especially dihydroquinacridone, dimethoxydihydroquinacridone and/or dibenzodihydroquinacridone, as β-nucleating agent.

According to a further preferred embodiment the β-nucleated propylene polymer contains 0.01 to 2.0 wt % of dicarboxylic acid salts of metals from group Ha of periodic system, especially pimelic acid calcium salt and/or suberic acid calcium salt; and/or mixtures of dicarboxylic acids and salts of metals from group Ha of periodic system, as β-nucleating agent.

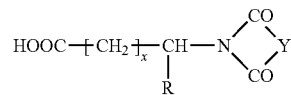

According to a further preferred embodiment the p-nucleated propylene polymer contains 0.01 to 2.0 wt % of salts of metals from group Ha of periodic system and imido acids of the formula
wherein x=1 to 4; R=H, —COOH, $C_1$-$C_{12}$-alkyl, $C_5$-$C_8$-cycloalkyl or $C_6$-$C_{12}$-aryl, and Y=$C_1$-$C_{12}$-alkyl, $C_5$-$C_8$-cycloalkyl or $C_6$-$C_{12}$-aryl-substituted bivalent $C_6$-$C_{12}$-aromatic residues, especially calcium salts of phthaloylglycine, hexahydrophthaloylglycine, N-phthaloylalanine and/or N-4-methylphthaloylglycine, as β-nucleating agent.

The inventive propylene polymers with improved properties may contain usual auxiliary materials such as 0.01 to 2.5 wt % stabilizers, and/or 0.01 to 1 wt % processing aids, and/or 0.1 to 1 wt % antistatic agents and/or 0.2 to 3 wt % pigments, in each case based on the propylene polymers used.

The stabilizers, contained in the inventive propylene polymers, preferably are mixtures of 0.01 to 0.6 wt % phenolic antioxidants, 0.01 to 0.6 wt % 3-arylbenzofuranones, 0.01 to 0.6 wt % processing stabilizers based on phosphites, 0.01 to 0.6 wt % high temperature stabilizers based on disulfides and thioethers and/or 0.01 to 0.8 wt % statically hindered amines (HALS).

A further object of the present invention is a process for producing propylene polymers with an improved property spectrum from propylene homopolymers with melt indices of 0.05 to 15%10 min at 230° C./2.16 kg and/or block copolymers from 90.0 to 99.9 wt % of propylene and 0.1 to 10 wt % of α-olefins with 2 or 4 to 18 carbon atoms with melt indices of 0.05 to 20%10 min at 230° C./2.16 kg, wherein β-nucleated propylene homopolymers have an IRτ≧0.98, a tensile modulus of ≧1500 MPa at +23° C. and a Charpy impact strength of 3 kJ/m² at −20° C. using notched test specimens, respectively, β-nucleated propylene block copolymers having an IRτ of the propylene homopolymer block of 0.98, a tensile modulus of ≧1100 MPa at +23° C. and a Charpy impact strength, ≧6 kJ/m² at −20° C. using notched test specimens, are produced by melt mixing of propylene homopolymers having an IRτ≧0.98, respectively propylene block copolymers having an IRτ of the propylene homopolymer block of ≧0.98, with 0.0001 to 2.0 wt %, based on the polypropylenes used, of β-nucleating agents at temperatures from 175 to 250° C.

For the melt mixing of the propylene polymers and the β-nucleating agents, conventional compounding extruders are used.

In producing the inventive propylene polymers the β-nucleating agents may be introduced into the propylene polymers as master batch for example from 0.05 to parts by weight of β-nucleating agent and 75 to 99.95 parts by weight of propylene polymer.

Preferred applications of the propylene polymers with improved properties as well as of mixtures with conventional propylene homopolymers and/or propylene copolymers are molded parts in a pipe system, such as pipes and fittings, inspection chambers, pipe ducting systems, extrusion or compression molded sheets and the like.

A further object of the invention is to provide articles with an improved balance of stiffness and impact strength at low temperatures.

It has been found that this object is achieved by using propylene homopolymers with melt indices of 0.05 to 15 g/10 min at 230° C./2.16 kg, which propylene homopolymers are β-nucleated, where the β-nucleated propylene homopolymers have an IRτ≧0.98, for producing these articles. Articles with a tensile modulus of ≧1500 MPa at +23° C. and a Charpy impact strength of ≧3 kJ/m² at −20° C., using notched test specimens, can be produced by using the aforementioned propylene homopolymers.

It has been found that this object is also achieved by using propylene block copolymers with 90.0 to 99.9 wt % propylene and 0.1 to 10 wt % α-olefins with 2 or 4 to 18 carbon atoms with melt indices of 0.05 to 20 g/10 min at 230° C./2.16 kg, which propylene block copolymers are β-nucleated, where the β-nucleated propylene block copolymers have an IRτ of the propylene homopolymer block of ≧0.98, for producing these articles. Articles with a tensile modulus of ≧21100 MPa at +23° C. and a Charpy impact strength, of ≧6 kJ/m² at −20° C., using notched test specimens, can be produced by using the aforementioned propylene block copolymers.

EXAMPLES

The following tests were made using injection molded samples prepared according to ISO 1873

Tensile modulus according to ISO 527 (cross head speed 1 mm/min) at +23° C. Charpy impact strength using notched specimens, according to ISO 179/1 eA Example 1

A mixture of 90 wt % of a propylene block copolymer, obtained by combined bulk and gas phase polymerization using a Ziegler-Natta catalyst system with dicyclopentyldimethoxysilane as external donor, having an ethylene content of 8.3 wt %, an IRτ of the propylene homopolymer block of 0.98, and a melt index of 0.30 g/10 min at 230° C./2.16 kg, 10 wt % of a master batch comprising 99 parts by weight of a propylene block copolymer having an ethylene content of 8.3 wt %, an IRτ of the propylene homopolymer block of 0.985 and a melt index of 0.30 g/10 min at 230° C./2.16 kg, and 1 part by weight of pimelic acid calcium salt and 0.1 wt % calcium stearate, 0.1 wt % tetrakis[methylene(3,5-di-t-butylhydroxyhydrocinnamate)]methane and 0.1 wt % tris-(2,4-di-t-butylphenyl) phosphite, based on the sum of the propylene polymers used, is melted in a twin screw extruder with a temperature profile of 100/145/185/210/220/200/185° C., homogenized, discharged and pelletized.

The resulting polypropylene polymer has a melt index of 0.32%/10 min at 230° C./2.16 kg, a tensile modulus of 1290 MPa and a Charpy impact strength, notched, of 39 kJ/m² at −20° C.

Example 2

A mixture of 94 wt % of a propylene homopolymer, obtained by bulk polymerization using a Ziegler-Natta catalyst system with dicyclopentyldimethoxysilane as external donor, having an IRτ of 0.985 and a melt index of 1.1 g/10 min at 230° C./2.16 kg, 6 wt % of a master batch comprising 98.8 parts by weight of a propylene block copolymer having an ethylene content of 8.3 wt %, an IRτ of the propylene homopolymer block of 0.985 and a melt index of 0.30 g/10 min at 230° C./2.16 kg, and 0.2 parts by weight of a mixed crystal of 5,12-dihydro(2,3b) acridine-7,14-dione with quino(2,3b)acridine-6,7,13,14-(5H,12H)-tetrone and 0.05 wt % calcium stearate, 0.1 wt % tetrakis[methylene(3,5-di-t-butylhydroxyhydrocinnamate)]methane and 0.1 wt % tris-(2,4-di-t-butyl-phenyl)-phosphite, based on the sum of the propylene polymers used is melted in a twin screw extruder with a temperature profile of 100/145/190/215/225/205/190° C., homogenized, discharged and pelletized.

The resulting polypropylene polymer has a melt index of 1.0 g/10 min at 230° C./2.16 kg, a tensile modulus of 1500 MPa and a Charpy impact strength, notched, of 11 kJ/m² at −20° C.

Example 3

A mixture of 75 wt % of a propylene block copolymer, obtained by combined bulk and gas phase polymerization using a Ziegler-Natta catalyst system with dicyclopentyldimethoxysilane as external donor, having an ethylene content of 8.3 wt %, an IRτ of the propylene homopolymer block of 0.985 and a melt index of 0.30 g/10 min at 230° C./2.16 kg, 25 wt % of a master batch comprising 99.5 parts by weight of a propylene block copolymer having an ethylene content of 8.3 wt %, an IRτ of the propylene homopolymer block of 0.987 and a melt index of 0.30 g/10 min at 230° C./2.16 kg, and 0.5 parts by weight of hexahydrophthaloylglycine calcium salt and 0.1 wt % calcium stearate, 0.1 wt % tetrakis[methylene(3,5-di-t-butylhydroxyhydrocinnamate)]methane and 0.1 wt % tris-(2,4-di-t-butylphenyl)phosphite, based on the sum of the propylene polymers used, is melted in a twin screw extruder with a temperature profile of 100/145/185/210/220/200/185° C., homogenized, discharged and pelletized.

The resulting polypropylene polymer has a melt index of 0.32 g/10 min at 230° C./2.16 kg, a tensile modulus of 1310 MPa and a Charpy impact strength, notched, of 37 kJ/m² at 20° C.

Example 4

A mixture of 95 wt % of a propylene homopolymer, obtained by bulk phase polymerization using a Ziegler-Natta catalyst system with dicyclopentyldimethoxysilane as external donor, having an IRτ of 0.987, and a melt index of 1.1 g/10 min at 230° C./2.16 kg, 5 wt % of a master batch comprising 97.5 parts by weight of a propylene homopolymer having an IRτ of 0.987 and a melt index of 4.2 g/10 min at 230° C./2.16 kg, and 2.5 parts by weight of N,N'-dicyclohexyl-2,6-naphthalenedicarboxamide and 0.05 wt % calcium stearate, 0.1 wt % tetrakis

[methylene(3,5-di-t-butylhydroxyhydrocinnamate)]methane and 0.1 wt % tris-(2,4-di-t-butylphenyl)-phosphite, based on the sum of the propylene polymers used, is melted in a twin screw extruder with a temperature profile of 100/145/190/215/225/205/190° C., homogenized, discharged and pelletized.

The resulting polypropylene polymer has a melt index of 1.2 g/10 min at 230° C./2.16 kg, a tensile modulus of 1765 MPa and a Charpy impact strength, notched, of 5.5 kJ/m² at −20° C.

Example 5

A mixture of 95 wt % of a propylene homopolymer, obtained by bulk phase polymerization using a Ziegler-Natta catalyst system with dicyclopentyldimethoxysilane as external donor, having i an IRτ of 0.987, and a melt index of 0.3 g/10 min at 230° C./2.16 kg, 5 wt % of a master batch comprising 97.5 parts by weight of a propylene homopolymer having an IRτ of 0.987 and a melt index of 0.3 g/10 min at 230° C./2.16 kg, and 2.5 parts by weight of N,N'-dicyclohexyl-2,6-naphthalenedicarboxamide and 0.05 wt % calcium 3 stearate, 0.1 wt % tetrakis[methylene(3,5-di-t-butylhydroxyhydrocinnamate)]methane and 0.1 wt % tris-(2,4-di-t-butylphenyl)-phosphite, based on the sum of the propylene polymers used, is melted in a twin screw extruder with a temperature profile of 100/145/190/215/225/205/190° C., homogenized, discharged and pelletized.

The resulting polypropylene polymer has a melt index of 0.3%10 min at 230° C./2.16 kg, a tensile modulus of 1750 MPa and a Charpy impact strength, notched, of 8.4 kJ/m² at 20° C.

The invention claimed is:

1. Propylene polymers comprising propylene homopolymers having melt indices of 0.05 to 15 g/10 min at 230° C./2.6 kg or propylene block copolymers of 90.0 to 99.9 wt % propylene and 0.1 to 10 wt % α-olefins of 2 or 4 to 18 carbon atoms having melt indices of 0.05 to 20 g/10 min at 230° C./2.16 kg, or mixtures thereof, wherein the propylene homopolymers or propylene block copolymers are β-nucleated, the β-nucleated propylene homopolymers having an IRτ≧0.98, a tensile modulus of ≧1500 MPa at +23° C. and a Charpy impact strength of ≧3 kJ/m² at −20° C. using notched test specimens, and the β-nucleated propylene block copolymers are polymers having an IRτ of the propylene homopolymer block of ≧0.98, a tensile modulus of ≧1100 MPa at +23° C. and a Charpy impact strength of ≧6 kJ/m² at −20° C. using notched test specimens.

2. Propylene polymers according to claim 1 wherein the melt indices at 230° C./2.6 kg of the propylene homopolymers and the propylene block copolymers are 0.1 to 8 g/10 min, the β-nucleated propylene homopolymers have a tensile modulus of ≧1600 MPa at +23° C. and a Charpy impact strength of 4 to 10 kJ/m² at −20° C. using notched test specimens, and the β-nucleated propylene block copolymers have a tensile modulus of ≧1300 MPa at +23° C. and a Charpy impact strength of ≧9 kJ/m² at −20° C. using notched test specimens.

3. Propylene polymers according to one of the claim 1 or 2, wherein the β-nucleated propylene homopolymers and propylene block copolymers are obtained by polymerization with a Ziegler-Natta catalyst system comprising titanium-containing solid components, an organoalumina, magnesium or titanium compound as cocatalyst and an external donor according to the formula

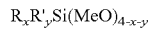

wherein R and R' are identical or different and are branched or cyclic aliphatic or aromatic hydrocarbon residues, and y and x independently from each other are 0 or 1, provided that x+y are 1 or 2.

4. Propylene polymers according to claim 3, wherein the external donor is dicyclopentyldimethoxysilane.

5. Propylene polymers according to claim 1 or 2, wherein the β-nucleated propylene polymers contain 0.01 to 2.0 wt %, in each case based on the propylene polymers, dicarboxylic acid derivative diamide compounds from $C_5$-$C_8$-cycloalkyl monoamines or $C_6$-$C_{12}$-aromatic monoamines and $C_5$-$C_8$-aliphatic, $C_5$-$C_8$-cycloaliphatic or $C_6$-$C_{12}$-aromatic dicarboxylic acids; and/or
  diamine derivative diamide compounds from $C_5$-$C_8$-cycloalkyl monocarboxylic acids or $C_6$-$C_{12}$-aromatic monocarboxylic acids and $C_5$-$C_8$-cycloaliphatic or $C_6$-$C_{12}$-aromatic diamines; and/or
  amino acid derivative diamide compounds from amidation reaction of $C_5$-$C_8$-alkyl-, $C_5$-$C_8$-cycloalkyl- or $C_8$-$C_{12}$-arylamino acids, $C_5$-$C_8$-alkyl-, $C_5$-$C_8$-cycloalkyl- or $C_6$-$C_{12}$-aromatic monocarboxylic acid chlorides and $C_5$-$C_8$-alkyl-, $C_5$-$C_8$-cycloalkyl- or $C_6$-$C_{12}$-aromatic mono-amines, as β-nucleating agent.

6. Propylene polymers according to claim 1 or 2, wherein the β-nucleated propylene polymers contain, as β-nucleating agent, at least one of quinacridone compounds, quinacridone-quinone compounds and dihydroquinacridone compounds in an amount of 0.0001 to 2.0 wt %.

7. Propylene polymers according to claim 1 or 2, wherein the β-nucleated propylene polymers contain 0.01 to 2.0 wt % of at least one of dicarboxylic acid salts of metals from group IIa of periodic system and mixtures of dicarboxylic acids and metals from group IIa of the periodic system as β-nucleating agent.

8. Propylene polymers according to claim 1 or 2, wherein the β-nucleated propylene polymers contain 0.01 to 2.0 wt % of salts of metals from group IIa of the periodic system and imido acids of the formula

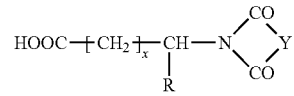

wherein x=1 to 4; R=H, —COOH, $C_1$-$C_{12}$-alkyl, $C_5$-$C_8$-cycloalkyl or $C_6$-$C_{12}$-aryl, and Y=$C_1$-$C_{12}$-alkyl, $C_5$-$C_8$-cycloalkyl or $C_6$-$C_{12}$-aryl- substituted bivalent $C_6$-$C_{12}$-aromatic residues, as β-nucleating agent.

9. A process for producing the propylene polymers according to claim 1 comprising melt mixing said propylene homopolymers having an IRτ≧0.98, or said propylene block copolymers having an IRτ of the propylene homopolymer block of ≧0.98, with 0.0001 to 2.0 wt %, based on the propylene polymers, of β-nucleating agents, said melt mixing occurring at temperatures from 175 to 250° C.

10. Molded articles comprising the propylene polymers according to claim 1 or 2.

11. Molded articles comprising the propylene homopolymers according to claim 1.

12. Molded articles comprising propylene block copolymers of 90.0 to 99.9 wt % propylene and 0.1 to 10 wt % α-olefins of 2 or 4 to 18 carbon atoms having melt indices of 0.05 to 20 g/10 min at 230° C./2.16 kg which propylene block copolymers are β-nucleated, where the β-nucleated propylene block copolymers have an IRτ of the propylene homopolymer block of 0.98, the molded articles having a tensile modulus of $\geq 1100$ MPa at +23° C. and a Charpy impact strength of $\geq 6$ kJ/m$^2$ at −20° C. using notched test specimens.

13. Propylene polymers according to claim 5, wherein the dicarboxylic acid derivative diamide compounds are N,N'-di-C$_5$-C$_8$-cycloalkyl-2,6-naphthalene dicarboxamide compounds, N,N'-di-C$_5$-C$_8$-cycloalkyl-4,4-biphenyldicarboxamide compounds, N,N'-di-C$_5$-C$_8$-cycloalkylterephthalamide compounds, N,N'-di-C$_5$-C$_8$-cycloalkyl-1,4-cyclohexanedicarboxamide compounds and/or N,N'-di-C$_6$-C$_{11}$-aryl-C$_5$-C$_8$-diamide compounds, the diamine derivative diamide compounds are N,N'—C$_6$-C$_{12}$-arylene-bis-benzamide compounds, N,N'-p-C$_6$-C$_{12}$-arylene-bis-C$_5$-C$_8$-cycloalkyl-bis-benzamide compounds, N,N'-p-C$_6$-C$_{12}$-arylene-bis-C$_5$-C$_8$-cycloalkylcarboxamide compounds and/or N,N'—C$_5$-C$_8$-cycloalkyl-bis-cyclohexanecarboxamide compounds, and the amino acid derivative diamide compounds are N-phenyl-5-(N-benzoylamino)pentaneamide and/or N-cyclohexyl-4-(N-cyclohexylcarbonylamino)benzamide.

14. Propylene polymers according to claim 6, wherein the quinacridone compounds are quinacridone, dimethylquinacridone and/or dimethoxyquinacridone, the quinacridonequinone compounds are quinacridonequinone, a mixed crystal of 5,12-dihydro(2,3b)acridine-7,14-dione with quino(2,3b)acridine-6,7,13,14-(5H,12H)-tetrone and/or dimethoxyquinacridonequinone, and the dihydroquinacridone compounds are dihydroquinacridone, dimethoxydihydroquinacridone and/or dibenzodihydroquinacridone.

15. Propylene polymers according to claim 7, wherein the dicarboxylic acid salts of metals from group IIa of the periodic system are pimelic acid calcium salt and/or suberic acid calcium salt.

16. Propylene polymers according to claim 8, wherein the salts of metals from group IIa of the periodic system and said amido acids are calcium salts of phthaloylglycine, hexahydrophthaloylglycine, N-phthaloylalanine and/or N-4-methylphthaloylglycine.

\* \* \* \* \*